US006952298B2

(12) United States Patent
Hara et al.

(10) Patent No.: US 6,952,298 B2
(45) Date of Patent: Oct. 4, 2005

(54) ELECTRO-OPTICAL DEVICE, METHOD OF DRIVING ELECTRO-OPTICAL DEVICE, METHOD OF SELECTING SCANNING LINE IN ELECTRO-OPTICAL DEVICE, AND ELECTRONIC APPARATUS

(75) Inventors: Hiroyuki Hara, Chino (JP); Hayato Nakanishi, Toyama (JP)

(73) Assignee: Seiko Epson Corporation, Tokyo (JP)

( * ) Notice: Subject to any disclaimer, the term of this patent is extended or adjusted under 35 U.S.C. 154(b) by 17 days.

(21) Appl. No.: 10/453,476

(22) Filed: Jun. 4, 2003

(65) Prior Publication Data

US 2004/0047530 A1 Mar. 11, 2004

(30) Foreign Application Priority Data

Jun. 7, 2002 (JP) ....................................... 2002-167775
Jun. 2, 2003 (JP) ....................................... 2003-157389

(51) Int. Cl.[7] ................................................ G02F 1/07
(52) U.S. Cl. ....................... 359/245; 359/242; 359/244; 359/315
(58) Field of Search ................................ 359/245, 242, 359/244, 267, 277, 299, 315, 320, 322

(56) References Cited

U.S. PATENT DOCUMENTS 6,522,319 B1 2/2003 Yamazaki
2002/0015031 A1 * 2/2002 Fujita et al. ................ 345/204
2003/0151582 A1 * 8/2003 Ishii ........................... 345/100

FOREIGN PATENT DOCUMENTS

CN 1262761 A 8/2000
JP A-05-072992 3/1993

OTHER PUBLICATIONS

Matsueda et al., "Concept of a System on Panel", *IDW '00*, Nov. 29, 2000, pp. 171–174.
Matsueda et al., "Concept of System on Panel", *AM–LCD '01*, Jul. 11, 2001, pp. 77–80.

* cited by examiner

*Primary Examiner*—Georgia Epps
*Assistant Examiner*—Brandi Thomas
(74) *Attorney, Agent, or Firm*—Oliff & Berridge, PLC

(57) ABSTRACT

The invention provides an electro-optical device capable of reducing power consumption. In an organic EL display, the pixel circuits are provided at the intersection portions of the respective scanning lines and the respective data lines, respectively. The organic EL display includes a shift register and a decoder circuit. The shift register sequentially selects the respective scanning lines in response to the clock signals. The decoder circuit receives address signals, and properly selects any one of the respective scanning lines on the basis of the address signals. Further, when displaying a moving picture, the scanning lines are sequentially selected using the shift register. On the other hand, when a part of a still picture is modified and displayed during display of the still picture, the scanning lines associated with the modification and display are designated using the decoder circuit.

7 Claims, 6 Drawing Sheets

[FIG. 1]
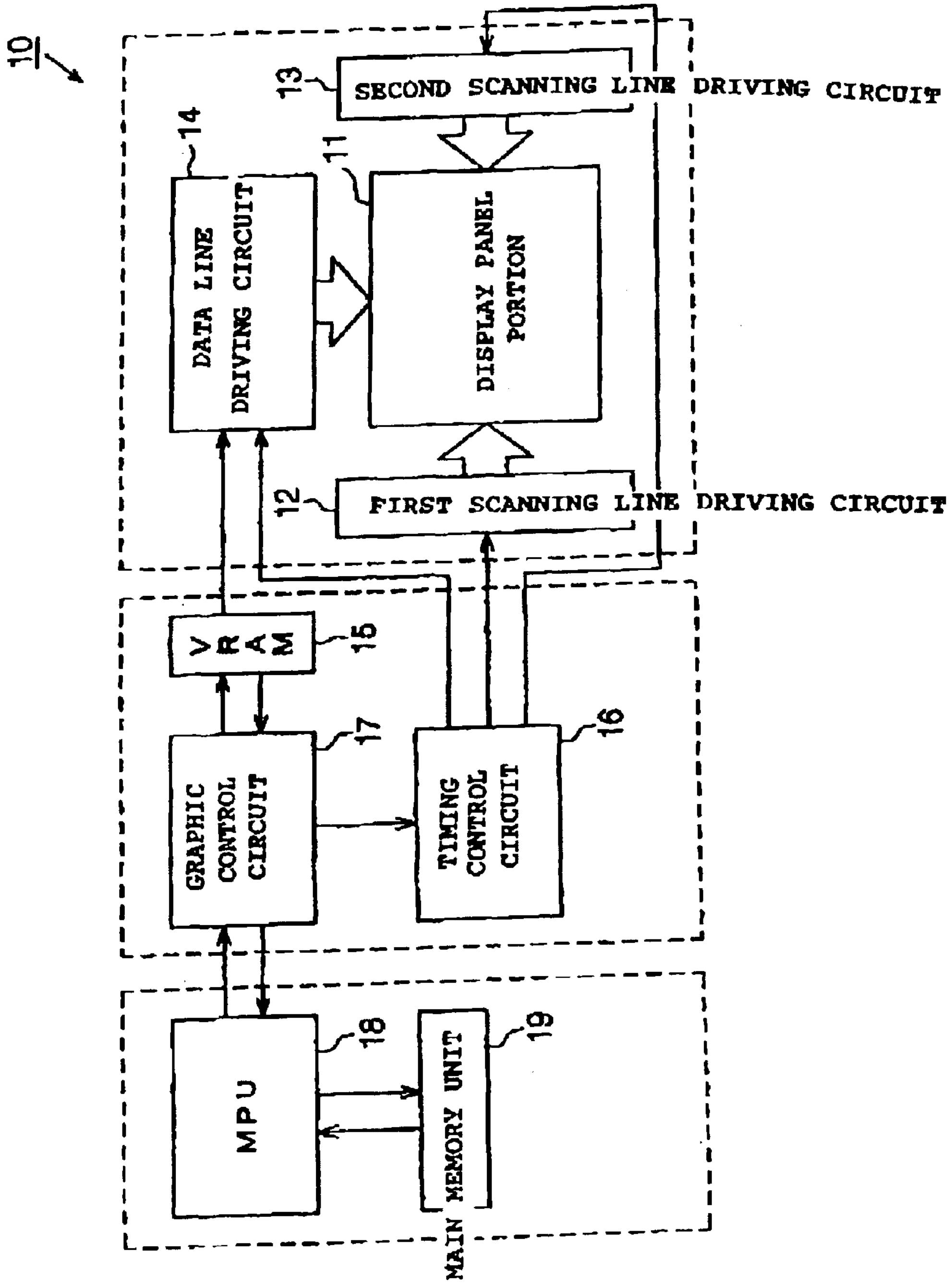

[FIG. 2]
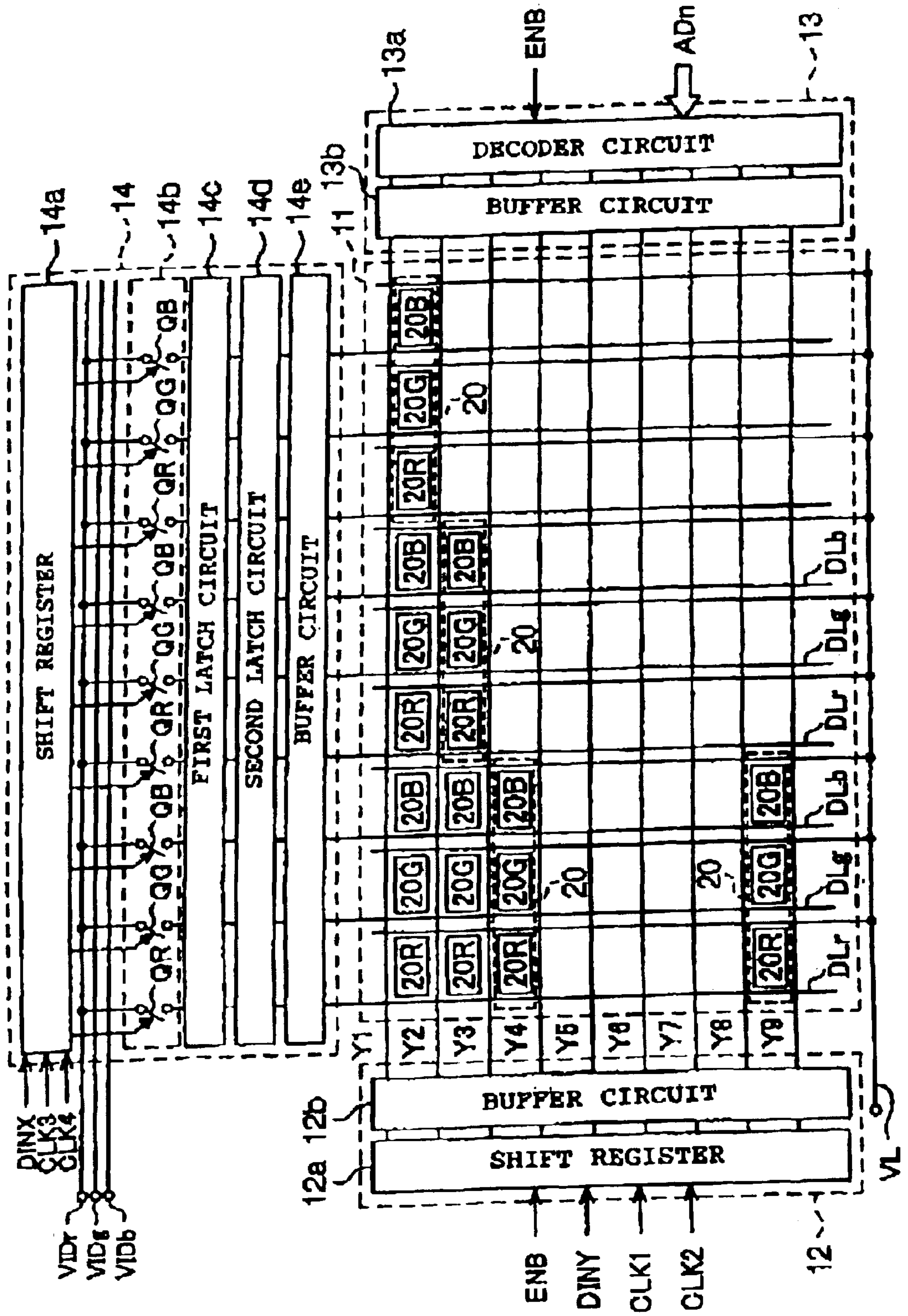

[FIG. 3]
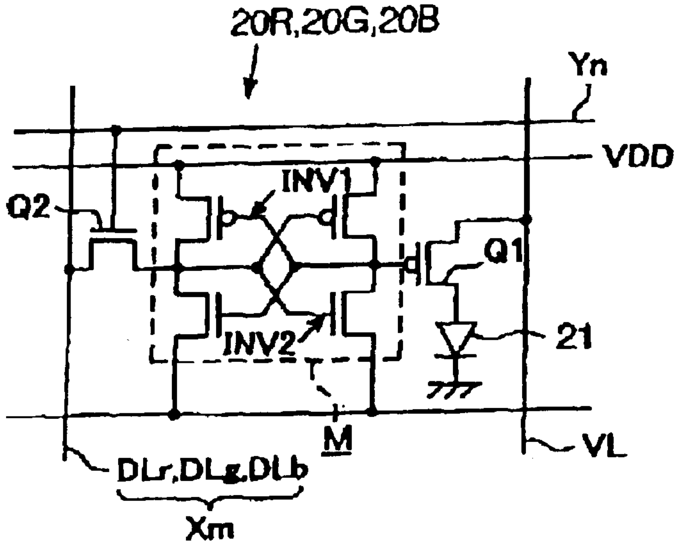
[FIG. 4]
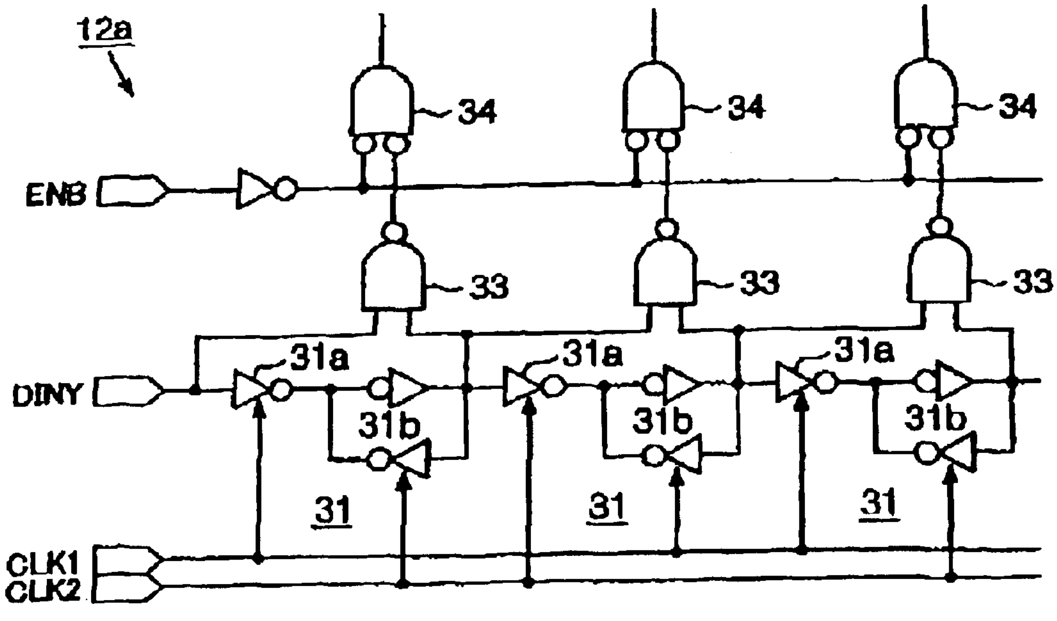

[FIG. 5]
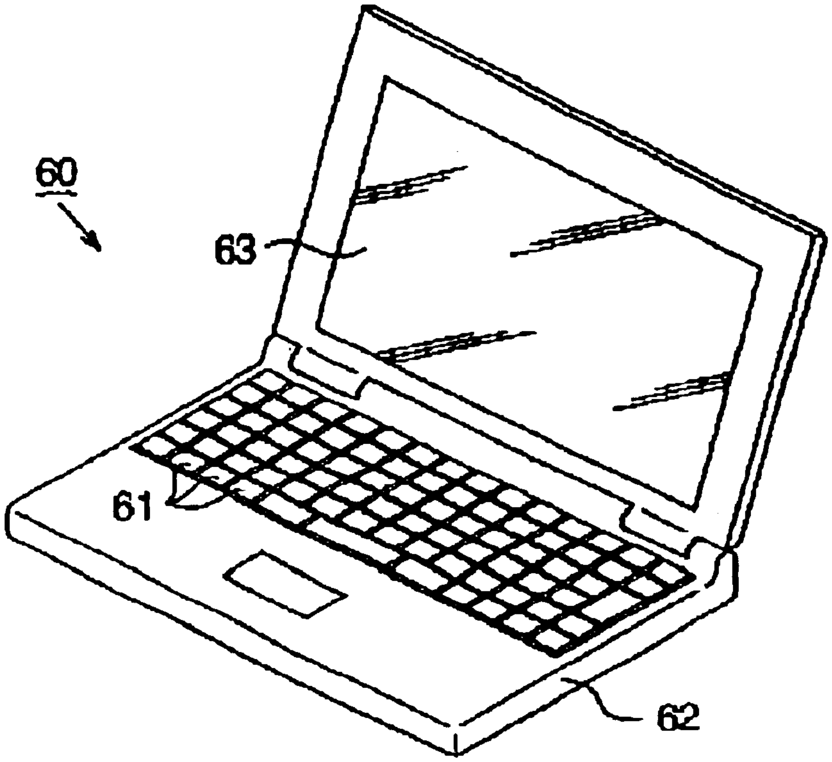

[FIG. 6]
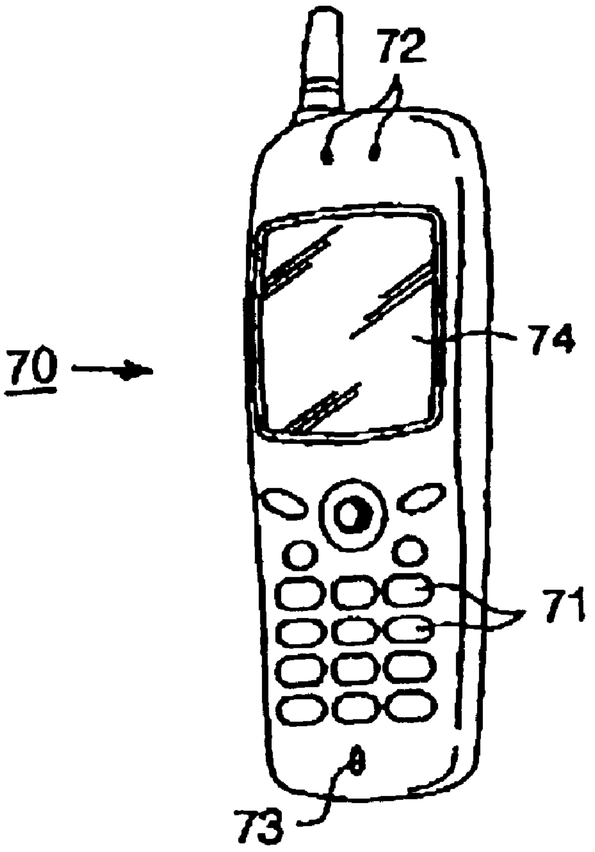

[FIG. 7]
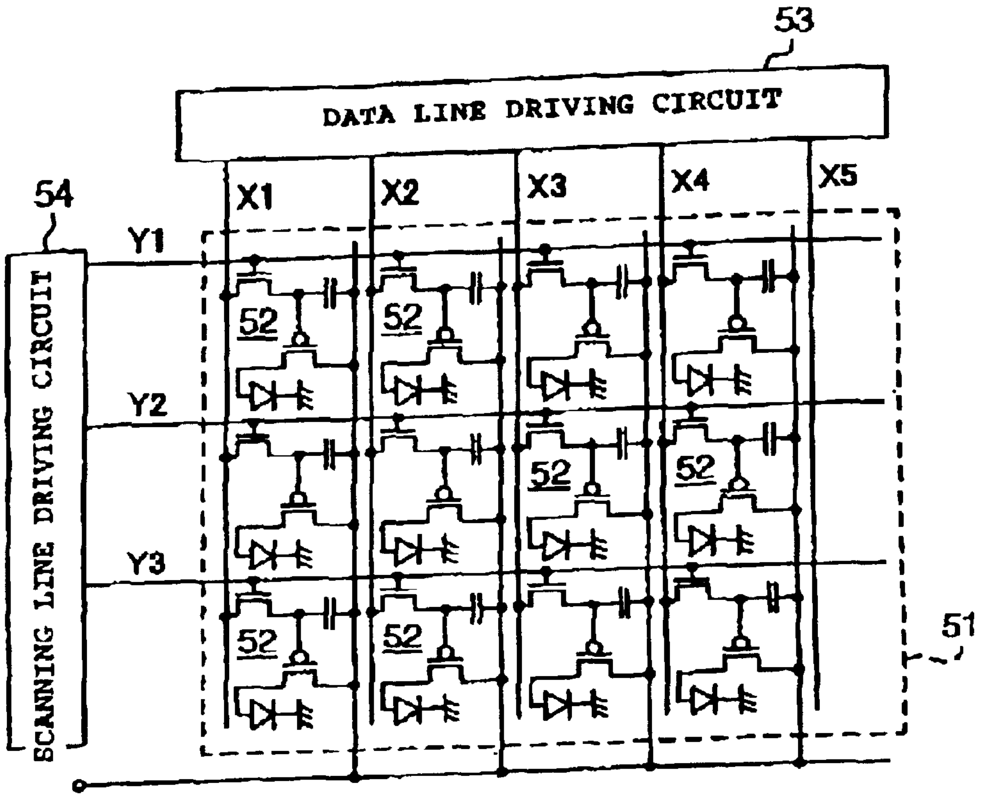

ELECTRO-OPTICAL DEVICE, METHOD OF DRIVING ELECTRO-OPTICAL DEVICE, METHOD OF SELECTING SCANNING LINE IN ELECTRO-OPTICAL DEVICE, AND ELECTRONIC APPARATUS

BACKGROUND OF THE INVENTION

1. Field of Invention

The present invention relates to an electro-optical device, a method of driving the electro-optical device, a method of selecting scanning lines in the electro-optical device, and an electronic apparatus.

2. Description of Related Art

An organic EL display is an example of a related art electro-optical device. This organic EL display exhibits good image quality, and thus can be used as a display device of portable electronic apparatuses, such as mobile phones, PDAs, notebook personal computers, and so on.

FIG. 7 shows basic electrical circuit blocks of a significant part of the organic EL display. In FIG. 7, in a display panel portion 51, intersection portions of a plurality of scanning lines Y1 to Yn (n is an integer) and a plurality of data lines X1 to Xm (m is an integer) are each provided with a pixel circuit 52 including organic EL elements (for example, as disclosed in International Publication Pamphlet No. WO 98/36407).

The respective data lines X1 to Xm are connected to a data line driving circuit 53. The data line driving circuit 53 includes a shift register, sequentially selects the plurality of data lines X1 to Xm one-by-one in response to a clock signal, and also supplies to the selected data line a video signal (data voltage) for making the organic EL element in the pixel circuits 52 emit light.

The scanning lines Y1 to Yn are connected to a scanning line driving circuit 54. The scanning line driving circuit 54 includes a shift register, and sequentially selects the plurality of scanning lines Y1 to Yn (n is an integer) one-by-one in response to a clock signal. Therefore, the video signal (data voltage) supplied from the data line driving circuit 53 is supplied to the pixel circuit 52 selected by the data line driving circuit 53 out of the respective pixel circuits 52 connected to the scanning line selected by the scanning line driving circuit 54.

In detail, when one scanning line is selected by the scanning line driving circuit 54, the data line driving circuit 53 sequentially selects the respective data lines X1 to Xm in a state where the one scanning line is selected. Therefore, the video signal (data voltage) is sequentially supplied to the respective pixel circuits 52 connected to the respective data lines X1 to Xm on the selected scanning line.

When the relevant video signals (data voltage) are supplied to all the pixel circuits 52 on the selected scanning line, the scanning line driving circuit 54 selects a next scanning line. Subsequently, the data line driving circuit 53 sequentially selects the respective data lines X1 to Xm like above, and sequentially supplies the video signals (data voltage) to the respective pixel circuits 52 on the newly selected scanning line. That is, by carrying out the similar processing to the scanning line Yn, the relevant video signals (data voltage) are supplied to the whole pixel circuits 52 and the organic EL elements emit light, so that display of one screen is completed.

Further, when the one screen was continuously displayed, that is, when the so-called still picture is displayed, a refresh process similar to above is carried out at every time that a predetermined time elapses. Furthermore, when only a part of the still picture is modified and displayed during display of the still picture, the process similar to above is carried out at every time that modification of the part of the still picture is carried out.

Furthermore, in the related art, a moving picture can be displayed in a display device of a mobile phone. In the display of the moving picture, the process similar to the above is carried out immediately after one screen has been displayed, and a process of displaying a new screen is continuously carried out using new video signals.

SUMMARY OF THE INVENTION

Electronic apparatuses that are portable and that can be referred to as portable electronic apparatus, such as mobile phones, PDAs, notebook personal computers, and so on, generally use a rechargeable battery as a power source. These apparatuses are used for a long time where a power source does not exist. For this reason, it is advantageous to reduce power consumption of the respective devices constituting the electronic apparatus. Therefore, it is necessary to accomplish lower power consumption of the organic EL display provided in these portable electronic apparatuses.

In the organic EL display employing the shift register in the aforementioned scanning line driving circuit 54, since the shift register having a simple circuit structure can be operated at a high speed, the display of a moving picture is far more advantageous compared with other scanning line selecting methods.

However, when only a part of a still picture is modified and displayed during display of the still picture, the process of selecting all the scanning lines Y1 to Yn and supplying the video signals to all the pixel circuits is performed. Therefore, since the process of supplying the video signals to all the pixel circuits is performed to modify the display of only a part of the still picture, unnecessary power consumption is executed.

The present invention addresses or solves the aforementioned and/or other problems, and provides an electro-optical device, a method of driving the electro-optical device, a method of selecting a scanning line in the electro-optical device, and an electronic apparatus, capable of reducing the power consumption.

An electro-optical device according to the present invention includes a plurality of scanning lines; a plurality of data lines arranged to intersect the respective scanning lines; and an electronic circuit provided at each intersecting portion of the respective scanning lines and the respective data lines. The electro-optical device further includes: a shift register to sequentially select the respective scanning lines in response to a clock signal; and a decoder to receive a digital code signal and properly select any one of the respective scanning lines on the basis of the digital code signal.

By doing so, for example, when a part of a still picture is modified and displayed, since only the scanning lines connected to the electronic circuits of the display position to be modified can be selected by the decoder and the part of the still picture can be modified and displayed by use of a minimum process, it is possible to accomplish lower power consumption.

In the electro-optical device according to the present invention, the shift register and the decoder receive a control signal such that one of the shift register and the decoder is active, the other of the shift register and the decoder is inactive.

By doing so, the shift register and the decoder can be used properly such that when a moving picture is displayed, the scanning lines are selected using the shift register and when a part of the still picture is modified and displayed, the scanning line is selected using the decoder.

In the electro-optical device according to the present invention, the decoder is active at least during display of a still picture, and when modifying and displaying a part of the still picture, selects the scanning line based on an address signal to designate the scanning line connected to the electronic circuits of a display position to be modified.

By doing so, since only the scanning line connected to the electronic circuits of the display position to be modified can be selected by the decoder, a part of the still picture can be modified and displayed by use of the minimum process, and thus it is possible to accomplish lower power consumption.

In the electro-optical device according to the present invention, each electronic circuit includes a memory circuit.

By doing so, the refresh process can be omitted and thus it is possible to accomplish lower power consumption.

In a method of driving an electro-optical device according the present invention, the electro-optical device includes a plurality of scanning lines; a plurality of data lines arranged to intersect the respective scanning lines; and an electronic circuit provided at each intersecting portion of the respective scanning lines and the respective data lines. The electro-optical device further includes a shift register to sequentially select the respective scanning lines in response to a clock signal and a decoder to receive a digital code signal and properly select any one of the respective scanning lines on the basis of the digital code signal. The shift register is used at least when driving the respective electronic circuits to display a moving picture. The decoder is used when driving the electronic circuits of a display position to be modified to modify and display a part of a still picture at least during display of the still picture.

By doing so, a high-speed rewrite is possible, a moving picture can be displayed, and it is possible to accomplish lower power consumption during display of the still picture.

In a method of selecting a scanning line in an electro-optical device according to the present invention, the electro-optical device includes a plurality of scanning lines; a plurality of data lines arranged to intersect the respective scanning lines; and an electronic circuit provided at each intersecting portion of the respective scanning lines and the respective data lines. The electro-optical device further includes a shift register to sequentially select the respective scanning lines in response to a clock signal and a decoder to receive a digital code signal and properly select any one of the respective scanning lines on the basis of the digital code signal. When one scanning line is selected in the shift register, the selected scanning line is selected by the shift register and the decoder.

By doing so, the selection of scanning lines can be carried out rapidly.

In the method of selecting a scanning line in an electro-optical device according to the present invention, the shift register and the decoder are disposed to sandwich the respective scanning lines therebetween and to face each other.

By doing so, the respective electronic circuits on the scanning line concurrently selected by the shift register and the decoder provided on both sides of the scanning lines can be selected equally rapidly.

An electronic apparatus according to the present invention is equipped with any one of the above electro-optical devices.

By doing so, a picture display in which power consumption is low and the moving picture can be displayed can be realized.

BRIEF DESCRIPTION OF THE DRAWINGS

FIG. 1 is a schematic circuit diagram illustrating a system structure of an organic EL display for explaining the first exemplary embodiment;

FIG. 2 is a schematic circuit diagram illustrating a circuit structure of a display panel portion for explaining the first exemplary embodiment;

FIG. 3 is a schematic circuit diagram illustrating an internal circuit structure of a pixel circuit for explaining the first exemplary embodiment;

FIG. 4 is a schematic circuit diagram illustrating a significant part of a shift register in the first scanning line driving circuit for explaining the first exemplary embodiment;

FIG. 5 is a perspective view illustrating a structure of a mobile type personal computer for explaining the second exemplary embodiment;

FIG. 6 is a perspective view illustrating a structure of a mobile phone for explaining the second exemplary embodiment;

FIG. 7 is a schematic circuit diagram illustrating a system structure of a related art organic EL display.

DETAILED DESCRIPTION OF PREFERRED EMBODIMENTS (First Exemplary Embodiment)

An exemplary embodiment of the present invention is described below with reference to FIGS. 1 to 4.

FIG. 1 is a schematic circuit diagram illustrating a system structure of an organic EL display 10 as an electro-optical device. FIG. 2 is a schematic circuit diagram illustrating a circuit structure of a display panel portion. FIG. 3 is a schematic circuit diagram illustrating an internal circuit structure of a pixel circuit and a pre-charge circuit.

In FIG. 1, the organic EL display 10 includes a display panel portion 11, a first scanning line driving circuit 12, a second scanning line driving circuit 13, a data line driving circuit 14, a video RAM (VRAM) 15, a timing control circuit 16, a graphic control circuit 17, an MPU 18 and a main memory unit 19.

Each of the elements 11 to 19 of the organic EL display 10 may be constructed as an independent electronic part. For example, each of the elements 12 to 19 may be constructed as one chip of a semiconductor integrated circuit device. Further, all or a part of the respective elements 11 to 19 may be constructed as an integral electronic part. For example, the first scanning line driving circuit 12, the second scanning line driving circuit 13 and the data line driving circuit 14 may be formed integrally into the display panel portion 11. All or a part of the respective elements 12 to 19 may be constructed as a programmable IC chip, so that functions thereof may be realized in software by a program written to the IC chip.

As shown in FIG. 2, in the display panel portion 11, a plurality of pixel circuits 20 are arranged in a matrix shape. Each of the pixel circuits 20 includes a pixel circuit for red color, a pixel circuit for green color and a pixel circuit for blue color 20R, 20G and 20B as electronic circuits, respectively. That is, the respective pixel circuits 20 including a pixel circuit for red color, a pixel circuit for green color and a pixel circuit for blue color 20R, 20G and 20B, respectively, are connected between a plurality of data lines X1 to Xm (m is an integer) extending in a column direction and a plurality of scanning lines Y1 to Yn (n is an integer) extending in a row direction. Further, the respective pixel circuits 20 are connected respectively to a power source lines VL extending in the column direction.

As shown in FIG. 3, the pixel circuit for red color, green color and blue color 20R, 20G and 20B of the respective pixel circuit 20 includes an organic EL element 21 as a current driving element in which an emitting layer is made up of organic material. In detail, the pixel circuit for red color 20R includes an organic EL element 21 to emit a red light. The pixel circuit for green color 20G includes an organic EL element 21 to emit a green light. The pixel circuit for blue color 20B includes an organic EL element 21 to emit a blue light. Further, as described below, transistors formed in the respective pixel circuits 20R, 20G, 20B usually are constituted of thin film transistors (TFT).

As shown in FIG. 3, the respective pixel circuits 20R, 20G, 20B include a driving transistor Q1, a switching transistor Q2 and a memory unit M as a memory circuit. The driving transistor Q1 is constituted of a P channel type transistor. The switching transistor Q2 is constituted of a N channel type transistor.

A drain of the driving transistor Q1 is connected to an anode of the organic EL element 21 and a source thereof is connected to the driving power source line VL. A gate of the driving transistor Q1 is connected to the memory unit M. A gate of the switching transistor Q2 of the respective pixel circuits 20R, 20G, 20B is connected to a relevant scanning line Y1 to Yn, respectively. Further, a drain of the switching transistor Q2 is connected to the data line X1 to Xm and a source thereof is connected to the memory unit M.

The respective data lines X1 to Xm include a data line for red color DLr, a data line for green color DLg and a data line for blue color DLb. Further, the switching transistor Q2 of the pixel circuit for red color 20R is connected to the data line for red color DLr. Further, the switching transistor Q2 of the pixel circuit for green color 20G is connected to the data line for green color DLg. Furthermore, the switching transistor Q2 of the pixel circuit for blue color 20B is connected to the data line for blue color DLb.

Furthermore, a video signal for red color VIDr is input to the pixel circuit for red color 20R through the data line for red color DLr from the data line driving circuit 12. Further, a video signal for green color VIDg is input to the pixel circuit for green color 20G through the data line for green color DLg from the data line driving circuit 12. Furthermore, a video signal for blue color VIDb is input to the pixel circuit for blue color 20B through the data line for blue color DLb from the data line driving circuit 12. The respective video signals VIDr, VIDg, VIDb are input to the memory unit M through the respective switching transistors Q2.

The memory unit M includes a latch circuit including two CMOS inverter circuits INV1, INV2. Further, when the high potential (H level) video signals VIDr, VIDg, VIDb is input through the switching transistor Q2, the memory unit M holds the video signals VIDr, VIDg, VIDb, and applies a low potential (L level) to the gate of the driving transistor Q1. The driving transistor Q1 is turned on in response to the L level output signal from the memory unit M, and drives the organic EL element 21. On the contrary, when the L level video signals VIDr, VIDg, VIDb is input through the switching transistor Q2, the memory unit M holds the video signals VIDr, VIDg, VIDb, and applies a H level to the gate of the driving transistor Q1. The driving transistor Q1 is turned off in response to the H level output signal from the memory unit M, and stops driving the organic EL element 21.

The first scanning line driving circuit 12 is connected to the respective scanning lines Y1 to Yn, and sequentially selects the scanning lines Y1 to Yn. The first scanning line driving circuit 12 includes a shift register 12*a* and a buffer circuit 12*b*.

FIG. 4 shows a partial circuit of a shift register 12*a*. The shift register 12*a* is constructed by connecting in series input portions 31*a* including a clocked inverter and latch circuit portions 31 including one general inverter by the number corresponding to the number of the scanning lines Y1 to Yn. The shift register 12*a* receives a scanning line selecting signal DINY of an H level pulse and first and second clock signals CLK1, CLK2 of complementary signals from a timing control circuit 16. Further, the scanning line selecting signal DINY of one pulse input from the latch circuit portion 31 at first stage is sequentially shifted to the latch circuit portion 31 at next stage in response to the first and second clock signals CLK1, CLK2 of complementary signals.

In detail, in the latch circuit portion 31 at an odd stage, the first clock signal CLK 1 is input to the input portion 31*a* and the second clock signal CLK 2 is input to the latch portion 31*b*. On the contrary, in the latch circuit portion 31 at an even stage, the second clock signal CLK 2 is input to the input portion 31*a* and the first clock signal CLK 1 is input to the latch portion 31*b*.

Therefore, when the first clock signal CLK 1 is output, the input portion 31*a* of the latch circuit portion 31 at the odd stage receives the input signal, and the latch portion 31*b* of the latch circuit portion 31 at the even stage inverts, latches and continuously outputs the output signal output from the input portion 31*a*. On the contrary, when the second clock signal CLK 2 is output, the input portion 31*a* of the latch circuit portion 31 at the even stage receives the input signal, and the latch portion 31*b* of the latch circuit portion 31 at the odd stage inverts, latches and continuously outputs the output signal output from the input portion 31*a*.

That is, the scanning line selecting signal DINY input to the latch circuit portion 31 at the first stage is sequentially shifted to the latch circuit portion 31 at the next stage every half period of the first and second clock signals CLK1, CLK2. Therefore, the input terminal and the output terminal of only the latch circuit portion 31 to which the H level scanning line selecting signal DINY is input become H level at the same time by use of the scanning line selecting signal DINY.

The respective latch circuit portion 31 of the shift register 12*a* includes a NAND circuit 33. The NAND circuit 33 is a NAND circuit having two input terminals, and the two input terminals are connected to the input terminal and the output terminal of the latch circuit portions 31, respectively. Therefore, the NAND circuit 33 of the latch circuit portion 31 latching the scanning line selecting signal DINY outputs L level when the input terminal and the output terminal of the latch circuit portion 31 are H level at the same time by use of the scanning line selecting signal DINY.

The NAND circuit 33 is connected to a NOR circuit 34. The NOR circuit 34 is a NOR circuit having two input terminals, and one input terminal receives the output signal from the NAND circuit 33 and the other input terminal receives an enable signal ENB. The enable signal ENB as a control signal is a signal to determine a moving picture mode of displaying a moving picture in the display panel portion 11 and a still picture mode of displaying a still picture in the display panel portion 11, and outputs from the timing control circuit 16. Further, in this exemplary embodiment, the timing control circuit 16 outputs L level enable signal ENB in the moving picture mode, and outputs an H level enable signal ENB in the still picture mode.

When the H level enable signal ENB is input (in the moving picture mode), the NOR circuit 34 outputs the output signal of the NAND circuit 33 through the buffer circuit 12*b* at the next stage to the relevant scanning line. That is, in the moving picture mode, the first scanning line driving circuit 12 is activated and can sequentially select the respective scanning lines Y1 to Yn based on the scanning line selecting signal DINY. On the contrary, in the still picture mode, the first scanning line driving circuit 12 is inactivated to be inactive, and does not select the respective scanning lines Y1 to Yn based on the scanning line selecting signal DINY.

The second scanning line driving circuit 13 is provided to sandwich the respective scanning lines Y1 to Yn and to be opposite to the first scanning line driving circuit 12, and is connected to the respective scanning lines Y1 to Yn.

The second scanning line driving circuit 13 includes a decoder circuit 13*a* and a buffer circuit 13*b*.

The decoder circuit 13*a* is provided with output terminals as many as the scanning lines Y1 to Yn. Further, the respective output terminals are connected to the relevant scanning lines Y1 to Yn through the buffer circuit 13*b*. The decoder circuit 13*a* receives the enable signal ENB. In this exemplary embodiment, when the enable signal ENB is H level (in the still picture mode), the decoder circuit 13*a* is activated. On the contrary, when the enable signal ENB is H level (in the moving picture mode), the decoder circuit 13*a* is inactivated.

The decoder circuit 13*a* receives an address signal ADn. The address signal ADn is a digital code data to designate any one of the respective scanning lines Y1 to Yn, and is outputted from the timing control circuit 16. When the address signal ADn is input from the timing control circuit 16 in the still picture mode, the decoder circuit 13*a* decodes the address signal ADn to select the scanning line designated by the address signal ADn out of the respective scanning lines Y1 to Yn. The decoder circuit 13*a* outputs a selecting signal of H level to the output terminal connected to the scanning line designated by the address signal ADn. The selecting signal of H level is output to the designated scanning line through the buffer circuit 13*b*, the scanning line is selected.

Therefore, the first scanning line driving circuit 12 sequentially selects from the scanning line Y1 to the scanning line Yn, and the second scanning line driving circuit 13 selects the relevant scanning line at a proper timing by use of decoding of the address signal ADn by the decoder circuit 13*a*.

The data line driving circuit 14 is connected to the respective data lines X1 to Xm. The data line driving circuit 14 sequentially selects the respective data lines X1 to Xm including the data lines for red color, green color and blue color DLr, DLg, DLb, and sequentially supplies the video signals VIDr, VIDg, VIDb to the pixel circuits for red color, green color and blue color 20R, 20G, 20B of the respective pixel circuits 20 on the one selected scanning line.

The data line driving circuit 14 includes a shift register 14*a*, a gate circuit 14*b*, a first latch circuit 14*c*, a second latch circuit 14*d* and a buffer circuit 14*e*.

The shift register 14*a* has the same circuit structure as the shift register 12*a* of the first scanning line driving circuit 12. That is, the same latch circuit portions as the latch circuit portions 31 are provided by three times (=3×m) the data lines X1 to Xm comprising the data lines for red color, green color and blue color DLr, DLg, DLb to be connected in series.

The shift register 14*a* receives a data line selecting signal DINX of an H level pulse and the third and fourth clock signals CLK3, CLK4 of complementary signals from the timing control circuit 16. The shift register 14*a* sequentially shifts the data line selecting signal DINX of one pulse to the latch circuit portion at a next stage in response to the third and fourth clock signals CLK3, CLK4. Further, the shift register sequentially outputs the H level data line selecting signal DINX from the latch circuit portion to the gate circuit 14*b*.

The gate circuit 14*b* includes analog switches for red color, green color and blue color QR, QG, QB of N channel type transistors with regard to the data lines for red color, green color and blue color DLr, DLg, DLb of the respective data lines X1 to Xm. The sources of the analog switches for red color, green color and blue color QR, QG, QB are connected to the data lines for red color, green color and blue color DLr, DLg, DLb of the relevant data lines X1 to Xm, respectively.

The drain of the analog switch for red color QR of the respective data lines X1 to Xm is connected to the video line for red color VILr, and receives the video signal for red color VIDr from the video RAM 15. The drain of the analog switch for green color QG of the respective data lines X1 to Xm is connected to the video line for green color VILg, and receives the video signal for green color VIDg from the video RAM 15. The drain of the analog switch for blue color QB of the respective data lines X1 to Xm is connected to the video line for blue color VILb, and receives the video signal for blue color VIDb from the video RAM 15.

The gates of the analog switches for red color, green color and blue color QR, QG, QB receives the data line selection signal DINX output from the latch circuit portion of the relevant shift register 14*a*, respectively. Further, the analog switches for red color, green color and blue color QR, QG, QB are turned on in response to the data line selecting signal DINX, and supply the video signals for red color, green color and blue color VIDr, VIDg, VIDb to the data lines for red color, green color and blue color DLr, DLg, DLb, respectively.

That is, in this exemplary embodiment, the video signals for red color, green color and blue color VIDr, VIDg, VIDb are sequentially supplied in the row direction, that is, to the pixel circuits for red color, green color and blue color 20R, 20G, 20B of the respective pixel circuits 20 connected to the selected scanning line, in synchronization with the data line selecting signal DINX.

The peripheral circuits to drive and control the first and second scanning line driving circuits 12, 13 and the data line driving circuit 14 are described below.

In FIG. 1, the MPU (Micro Processor Unit) 18 is a control circuit to control the organic EL display 10 as a whole, and is connected to the graphic control circuit 17 to transmit and receive data each other. The MPU 18 reads out image data to display the moving picture or the still picture in the display panel portion 11, the image data being stored in the main memory unit 19, to output the image data to the graphic control circuit 17. When the MPU 18 outputs the image data to the graphic control circuit 17, the image data is output together with special data of the still picture or the moving picture.

The graphic control circuit 17 controls the video RAM 15 and the timing control circuit 16 as a whole, and also generates display data and synchronizing signals (vertical synchronizing signal, horizontal synchronizing signal) based on the image data input from the MPU 18. The video RAM 15 stores the display data prepared by the graphic control circuit 17. The timing control circuit 16 generates the first to fourth clock signals CLK1 to CLK4, the scanning line selecting signal DINY and the data line selecting signal DINX based on the synchronizing signal from the graphic control circuit 17.

Further, when the image data output from the MPU 18 is the image data to display the moving picture, the graphic control circuit 17 generates the first to fourth clock signals CLK1 to CLK4, the scanning line selecting signal DINY and the data line selecting signal DINX to the timing control circuit 16. At this time, the graphic control circuit 17 generates the enable signal ENB of H level to the timing control circuit 16 in order to select the first scanning line driving circuit 12. Furthermore, the graphic control circuit 17 extracts and outputs the display data (video signals VIDr, VIDg, VIDb) corresponding to the respective pixel circuits 20 (20R, 20G, 20B) to the video RAM 15 in the predetermined order and at the predetermined timing.

Therefore, the video signals VIDr, VIDg, VIDb output from the video RAM 15 in the predetermined order and at the predetermined timing are supplied to the pixel circuits 20 of the respective scanning lines Y1 to Yn in the predetermined order to display one screen of the moving picture. Thereafter, by the similar controls, the image data to sequentially display the moving picture is outputted from the MPU 18, the display data for the moving picture is prepared on each occasion, and then the video signals VIDr, VIDg, VIDb are output to the pixel circuits 20 at a predetermined timing. As a result, the moving picture is displayed in the display panel portion 11.

On the other hand, when the image data output from the MPU 18 is the image data to display the still picture, the graphic control circuit 17 first, in the same way as above, generates the first to fourth clock signals CLK1 to CLK4, the scanning line selecting signal DINY and the data line selecting signal DINX to the timing control circuit 16. At this time, the graphic control circuit 17, similarly to a case of the moving picture display, generates the enable signal ENB of H level to the timing control circuit 16 in order to select the first scanning line driving circuit 12. That is, in this exemplary embodiment, the first screen of the still picture display is displayed by operating the first scanning line driving circuit 12 to supply the video signals VIDr, VIDg, VIDb output from the video RAM 15 in the predetermined order and at the predetermined timing to the pixel circuits 20 of the respective scanning lines Y1 to Yn.

When the video signals VIDr, VIDg, VIDb for the first screen are completely output in displaying the still picture, the graphic control circuit 17 goes on in the still picture display mode, makes the respective signals CLK1 to CLK4, DINY, DINX be inactive through the timing control circuit 16 and also makes the enable signal ENB be L level. Further, the graphic control circuit 17 waits for input of the image data to modify and display a part of the previous still picture from the MPU 18. Therefore, in this waiting state, since the video signals VIDr, VIDg, VIDb are held by the memory unit M, the respective pixel circuits 20 (20R, 20G, 20B) continuously display the first still picture.

At last, when the image data to modify and display a part of the still picture is input from the MPU 18, the graphic control circuit 17 prepares the display data and stores the display data in the video RAM 15 on the basis of the image data. At this time, the previous display data and the new display data are compared and the pixel circuits 20 in which the data for modification and display is rewritten are calculated. Subsequently, the graphic control circuit 17 calculates the scanning lines connected to the respective pixel circuits 20 to be rewritten. When calculating one or plural scanning lines connected to the pixel circuits 20 to be rewritten, the graphic control circuit 17 sequentially outputs the address signal ADn to designate the calculated scanning lines to the decoder circuit 13*a* of the second scanning line driving circuit 13 through the timing control circuit 16. At this time, the timing control circuit 16 outputs the third and fourth clock signals CLK3, CLK4 and the data line selecting signal DINX every time the timing control circuit outputs one address signal ADn.

Further, the graphic control circuit 17 specifies the display data (the video signals VIDr, VIDg, VIDb) for the respective pixel circuits 20 (20R, 20G, 20B) on the scanning line designated by the address signal ADn stored in the video RAM 15, and outputs the display data in synchronization with the third and fourth clock signal CLK3, CLK4. Therefore, by use of the address signal ADn, the decoder circuit 13*a* designates the scanning line, and the video signals VIDr, VIDg, VIDb for modification and display are output to the respective pixel circuits 20 (20R, 20G, 20B) on the selected scanning line through the data line driving circuit 14.

When the video signals VIDr, VIDg, VIDb are completely output to the respective pixel circuits 20 (20R, 20G, 20B) on one scanning line, the graphic control circuit 17, similarly to above, sequentially designates the remaining scanning lines for modification and display by use of the address signals ADn. The graphic control circuit 17, similarly to above, reads out the relevant video signals VIDr, VIDg, VIDb from the video RAM 15 to output the video signals to the respective pixel circuits 20 (20R, 20G, 20B) on the relevant scanning lines. By doing so, the new still picture obtained by modifying and displaying a part of the still picture previously displayed is displayed on the screen. That is, by selecting only the scanning lines of the pixel circuits 20 necessary to the modification and display without selecting all the scanning lines Y1 to Yn, a new still picture of which a part is modified and displayed is displayed on the screen.

Features of the organic EL display 10 constructed as described above are described below.

(1) According to this exemplary embodiment, when a moving picture is displayed, the shift register 12*a* of the first scanning line driving circuit 12 is driven to sequentially select the respective scanning lines Y1 to Yn and display one picture. Further, when a still picture is displayed, the address signals ADn are output to the decoder circuit 13*a* of the second scanning line driving circuit 13 to select properly the scanning lines which should be selected for the modification and display, a new still picture obtained by modifying and displaying a part of the still picture previously displayed is displayed.

Therefore, when displaying a moving picture, it is possible to easily carry out the high-speed modification of display by use of the shift register 12*a*. Further, when a part of a still picture is modified and displayed, since only the scanning lines associated with the modification of display are selected, it is possible to reduce the operation times and thus reduce power consumption as much. As a result, since a moving picture can be displayed in the organic EL display 10 by the shift register 12*a*, it is possible to accomplish lower power consumption when displaying the still picture.

(2) According to this exemplary embodiment, for the first still picture in displaying a still picture, since the shift register 12*a* is driven to sequentially select the respective scanning lines Y1 to Yn and display the still picture, it is possible to display the first still picture at a high speed.

(3) According to this exemplary embodiment, the respective pixel circuits 20 (20R, 20G, 20B) are provided with the memory unit M including a latch circuit of CMOS inverter circuits INV1, INV2. Therefore, even though the scanning line is non-selected after holding the video signals VIDr, VIDg, VIDb, the video signals VIDr, VIDg, VIDb can be held. As a result, as in displaying the still picture, even when the rewriting of the video signals VIDr, VIDg, VIDb are not carried out for a long time, it is not necessary to carry out the refresh process and thus it is possible to accomplish lower power consumption.

(Second Exemplary Embodiment)

Applications of the electronic apparatus of the organic EL display 10 as an electro-optical device described in the first and second exemplary embodiments to an electronic apparatus are described below with reference to FIGS. 5 and 6. The organic EL display 10 can apply to various electronic apparatuses, such as mobile type personal computers, mobile phones, digital cameras, and so on.

FIG. 5 is a perspective view illustrating a structure of a mobile type personal computer. In FIG. 5, the personal computer 60 includes a main body 62 including a keyboard 61 and a display unit 63 employing the organic EL display 10. In this case, the display unit 63 using the organic EL display 10 exhibits advantages similar to the aforementioned exemplary embodiment. As a result, since the personal computer 60 consumes low power, it is possible to realize the image display in which a moving picture can be displayed.

FIG. 6 is a perspective view illustrating a structure of a mobile phone. In FIG. 6, the mobile phone 70 includes a plurality of manipulating buttons 71, an earpiece 72, a mouthpiece 73 and a display unit 74 using the aforementioned organic EL display 10. In this case, the display unit 74 employing the organic EL display 10 exhibits advantages similar to the aforementioned exemplary embodiment. As a result, since the mobile phone 70 includes low power, it is possible to realize the image display in which a moving picture can be displayed.

Furthermore, exemplary embodiments of the present invention may be modified as follows, for example.

In the above exemplary embodiment, when displaying a still picture, only first still picture is displayed by selecting the scanning lines Y1 to Yn using the first scanning line driving circuit 12. However, instead, the scanning lines Y1 to Yn may be also selected using the second scanning line driving circuit 13 (the decoder circuit 13*a*) to display the first still picture.

In the above exemplary embodiment, the data line driving circuit 14 includes the shift register 14*a* and the respective data lines X1 to Xm including the data lines for red color, green color and blue color DLr, DLg, DLb are selected with the shift register 14*a*. However, instead, a second data line driving circuit including a decoder circuit similar to the decoder circuit 13*a* of the second scanning line driving circuit 13 may be further provided to carry out the selection of the data lines.

In this case, when a part of a still picture is modified and displayed, the decoder circuit of the second data line driving circuit is made to select only the data lines associated with the modification and display. By doing so, since the operation times to select the data lines and output the video signals is reduced, it is possible to accomplish lower power consumption.

In the aforementioned exemplary embodiment, when only a part of a still picture is modified and displayed, the second scanning line driving circuit 13 is activated to select the scanning lines designated by use of the address signals ADn. However, instead, when displaying a moving picture and when first displaying a still picture in displaying a still picture, the second scanning line driving circuit 12 may be activated to sequentially select the scanning lines in cooperation with the first scanning line driving circuit 12. In this case, since the selected scanning lines are supplied with the selecting signal from both sides of the first scanning line driving circuit 12 and the second scanning line driving circuit 13, the selection of scanning lines can be selected at a high speed. As a result, it is possible to display a moving picture with a high quality.

In the aforementioned exemplary embodiment, in the organic EL display 10, each of the pixel circuits 20 (20R, 20G, 20B) includes the memory unit M including the latch circuit. Instead, the present invention may be adapted to the organic EL display including the pixel circuits 52 having a holding capacitor shown in FIG. 7.

In the aforementioned exemplary embodiment, although the electro-optical device including the pixel circuits 20 as electronic circuits including the organic EL elements 21 is described, in place of the organic EL elements 21, for example light emitting elements, such as LEDs, FEDs or inorganic EL elements may be employed. Further, electro-optical elements, such as liquid crystal elements, electrophoresis elements and electron emitting elements may be employed.

In the aforementioned exemplary embodiment, although the pixel circuits 20R, 20G, 20B are adapted to pixel circuits in which a voltage signal is used as a data signal, the pixel circuits 20R, 20G, 20B may be adapted to pixel circuits in which a current signal is used as a data signal.

In the aforementioned exemplary embodiment, although the organic EL display in which the pixel circuits for three colors 20R, 20G, 20B are provided for the organic EL elements 21 of three colors is described, the present invention may be adapted to the organic EL display including pixel circuits of EL elements having one color, two colors or four colors.

Furthermore, pixel circuits to be digitally driven of time division, area gradation or the like may be adapted to the organic EL display.

An example of the time division gradation is described below. In methods of driving the electro-optical device including electro-optical elements, such as liquid crystal elements, the method of the time division gradation is one method of displaying the gradation. A time division gradation method can also be used as a method of selecting a scanning line, which one scanning line is selected and then the next scanning line skipping one or more scanning lines from the one scanning line is selected, instead of sequentially selecting the scanning lines from the upper side. In this driving method including a process of not sequentially selecting the scanning lines from the upper side, the scanning line driving circuit including the decoder circuit described in the above exemplary embodiment is effective.

What is claimed is:

1. An electro-optical device, comprising:

a plurality of scanning lines;

a plurality of data lines arranged to intersect the respective scanning lines; and an electronic circuit provided at each intersecting portion of the respective scanning lines and the respective data lines;

a shift register to sequentially select the respective scanning lines in response to a clock signal; and a decoder to receive a digital code signal and properly select any one of the respective scanning lines on the basis of the digital code signal, the shift register and the decoder receiving a control signal such that when one of the shift register and the decoder is active, the other of the shift register and the decoder is inactive.

2. The electro-optical device according to claim 1, the decoder being active at least during display of a still picture, and when modifying and displaying a part of the still picture, selecting the scanning line based on an address signal to designating the scanning line connected to the electronic circuits of a display position to be modified.

3. The electro-optical device according to claim 1, each electronic circuit including a memory circuit.

4. A method of driving an electro-optical device, the electro-optical device including: a plurality of scanning lines, a plurality of data lines arranged to intersect the respective scanning lines, and an electronic circuit provided at each intersecting portion of the respective scanning lines and the respective data lines, the method comprising:

sequentially selecting the respective scanning lines in response to a clock signal with a shift register;

receiving a digital code signal and properly select any one of the respective scanning lines on the basis of the digital code signal with a decoder;

using the shift register at least when driving the respective electronic circuits to display a moving picture; and using the decoder when driving the electronic circuits of a display position to modify and display a part of a still picture at least during display of the still picture.

5. A method of selecting a scanning line in an electro-optical device, the electro-optical device including: a plurality of scanning lines, a plurality of data lines arranged to intersect the respective scanning lines, and an electronic circuit provided at each intersecting portion of the respective scanning lines and the respective data lines, the method comprising:

sequentially selecting the respective scanning lines in response to a clock signal with a shift register;

receiving a digit code signal and properly selecting any one of the respective scanning lines on the basis of the digital code signal with a decoder;

the selected scanning line being selected by the shift register and the decoder when one scanning line is selected in the shift register, the shift register and the decoder receiving a control signal such that when one of the shift register and the decoder is active, the other of the shift register and the decoder is inactive.

6. The method of selecting a scanning line in an electro-optical device according to claim 5, the shift register and the decoder being disposed to sandwich the respective scanning lines therebetween and to face each other.

7. An electronic apparatus, comprising:

the electro-optical device according to claim 1.

* * * * *